(12) United States Patent
Murphy et al.

(10) Patent No.: US 6,176,498 B1
(45) Date of Patent: Jan. 23, 2001

(54) UTILITY CART WITH LIFT MECHANISM

(75) Inventors: Kent W. Murphy, Wooster; Ronni S. Sterns; Harvey L. Sterns, both of Akron, all of OH (US)

(73) Assignee: Creative Action, Inc., Akron, OH (US)

( * ) Notice: Under 35 U.S.C. 154(b), the term of this patent shall be extended for 0 days.

(21) Appl. No.: 09/209,174

(22) Filed: Dec. 10, 1998

(51) Int. Cl.[7] .................................................. B62B 1/00
(52) U.S. Cl. ........................ 280/33.992; 280/47.29; 280/652
(58) Field of Search ................ 280/33.992, 33.995, 280/33.997, 651, 652, 655, 655.1, 659, 43.1, 43.2, 43.21, 43.24, 47.11, 47.131, 47.17, 47.18, 47.19, 47.2, 47.24, 47.26, 47.27, 47.28, 47.29, 47.31, 47.315, 30, 47.35, 47.371, 47.34, 654, DIG. 3, DIG. 4

(56) References Cited

U.S. PATENT DOCUMENTS

| | | |
|---|---|---|
| 2,422,862 | 6/1947 | Stottrup . |
| 2,443,236 * | 6/1948 | Gallagher ........................ 280/DIG. 4 |
| 2,514,824 | 7/1950 | Zenko . |
| 2,881,865 | 4/1959 | Lewis . |
| 3,052,323 * | 9/1962 | Hopfeld .................................. 187/10 |
| 3,118,553 * | 1/1964 | Rosenzweig ..................... 280/33.995 |
| 3,429,403 * | 2/1969 | Drechsler et al. .............. 280/33.995 |
| 3,739,879 | 6/1973 | House . |
| 4,004,825 * | 1/1977 | Green .................................... 280/654 |
| 4,258,826 * | 3/1981 | Murray .................................. 182/20 |
| 4,655,466 | 4/1987 | Hanaoka . |
| 4,865,346 * | 9/1989 | Carlile .................................. 280/654 |
| 5,385,358 * | 1/1995 | Adamson ........................ 280/33.995 |
| 5,513,873 * | 5/1996 | Chen .................................... 280/655 |
| 5,575,605 * | 11/1996 | Fisher .................................. 414/490 |
| 5,577,745 * | 11/1996 | Birk .................................. 280/47.19 |
| 5,938,396 * | 8/1999 | Audet .................................. 414/490 |

* cited by examiner

Primary Examiner—Brian L. Johnson
Assistant Examiner—Bridget Avery
(74) Attorney, Agent, or Firm—Rankin, Hill, Porter & Clark LLP

(57) ABSTRACT

A manually-operated utility cart for carrying a removable basket. The cart has a basket support adapted to move in a vertical path to raise and lower the removable basket between desired vertical positions. The basket support is moved by means of a gear mechanism that includes generally vertical racks attached to the basket support and pinions that engage the racks and which are mounted on a horizontal shaft supported on an upright frame. The gear mechanism is manually operated by the operator using a crank arm or other similar mechanism. The basket is provided with a door on one side that can be pivoted downwardly for better access to the contents of the basket.

7 Claims, 5 Drawing Sheets

UTILITY CART WITH LIFT MECHANISM

This invention was made with government support under the Small Business Innovation Research Program Grant Number 2 R44 AGl1500-02, awarded by National Institutes of Health National Institute on Aging. The government has certain rights in the invention.

BACKGROUND OF THE INVENTION

The invention relates to manually-operated utility carts of the type adapted to carry a portable receptacle such as a basket. More particularly, the invention relates to a utility cart that includes a lift mechanism so that the basket may be raised and lowered to position it at a convenient height.

The invention has particular utility for persons who need to transport various loads, but who have difficulty doing so due to age related functional limitations or other difficulties that adversely affect their mobility.

For example, persons with such functional limitations may find it difficult to carry a load of items in a basket to and from a laundry area. Once at the site, they may have difficulty loading the laundry from a basket into a washing machine, transferring the laundered load to a dryer arid then transferring the dried load back to the basket. Other examples of situations where transporting various loads can present difficulties are (1) transporting groceries and other items in a store and (2) transporting letters and packages in a mailroom.

Part of the problem involves the lifting and lowering of the basket between vertical positions that are convenient to a washing machine on the one hand and a dryer on the other. The positions that are most convenient vary from one appliance to another. Where strength and flexibility are reduced due to functional limitations, it is particularly difficult to lift a basket that is full of laundry, particularly when the laundry is wet.

The utility cart of the present invention resolves many of the difficulties referred to above and affords other features and advantages heretofore not obtainable.

SUMMARY OF THE INVENTION

In accordance with the invention, there is provided a manually operated utility cart for carrying a removable basket wherein the cart has a generally horizontal base with rollers mounted thereon. The front rollers are preferably mounted to swivel about a vertical axis to improve ease of handling. Mounted on the base is an upright frame that extends to a convenient height. Handles are preferably attached to the top of the upright frame at an ergonomically-determined position for the user.

Supported on the upright frame is a basket support assembly that is movable relative to the fixed upright frame between a raised position and a lowered position. Included in the basket support assembly are a pair of parallel generally vertical racks that extend upwardly from the bottom of the basket support.

A generally horizontal axle is journaled on the fixed upright frame and has a pair of pinions mounted at opposite ends thereof The pinions engage the racks so that rotation of the pinions serves to raise and lower the basket support.

The assembly also includes a means for rotating the axle by means of a handle or the like in such a way that a mechanical advantage is provided to the user. In this way, the operator, can, with minimum effort, raise and lower the basket carried on the support to a desired vertical position.

DESCRIPTION OF THE PREFERRED EMBODIMENT

Figure 6:
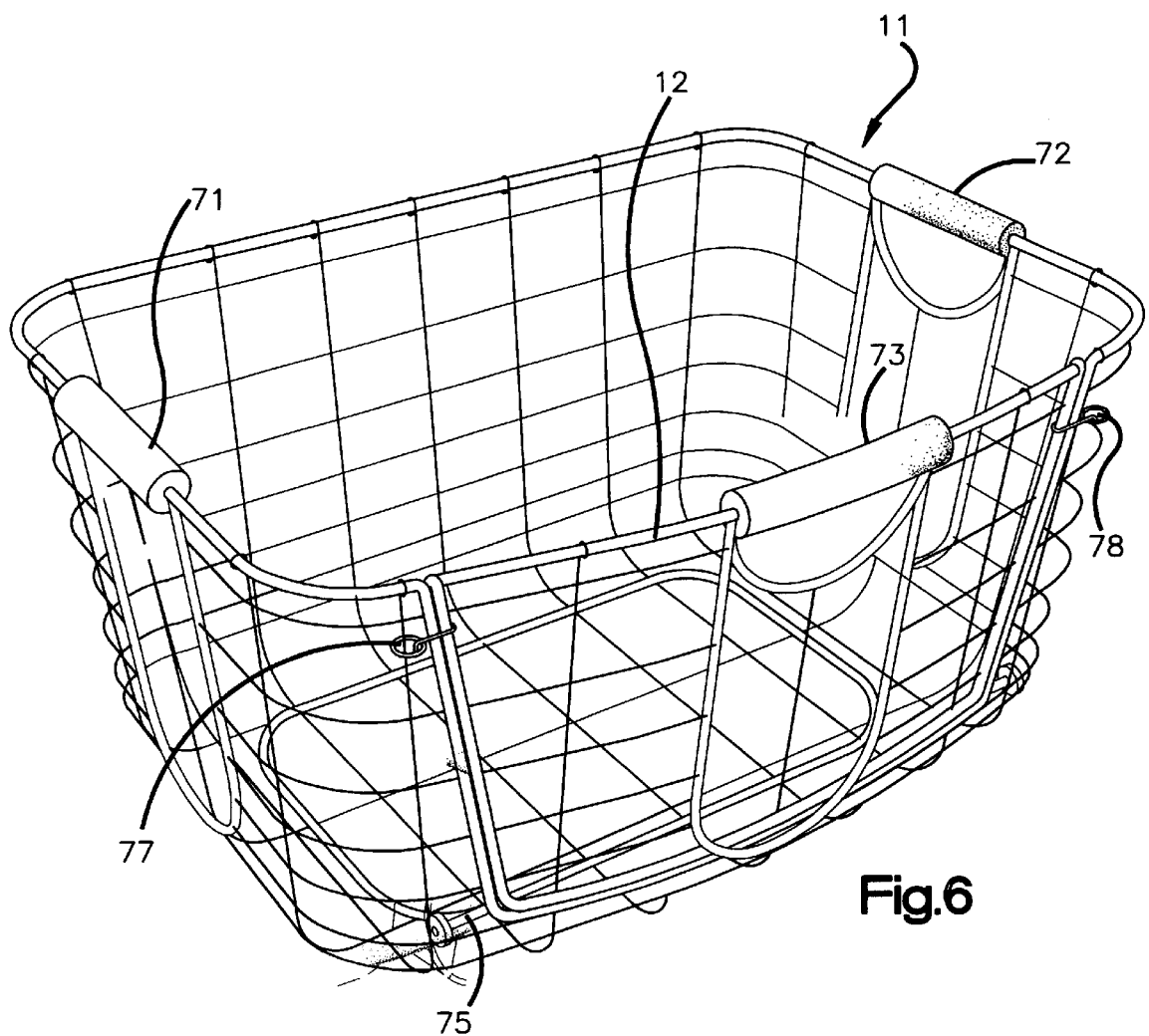
FIG. 6 is a perspective view showing the basket that is adapted to be supported on the utility cart of the invention.

Referring more particularly to the drawings, there is shown a manually-operated utility cart 10 adapted to support and transport a basket 11. The basket has a hinged door 12 in the front end that is pivoted about a horizontal axis at the bottom so that it may be opened to facilitate loading and removal of items from the basket (FIG. 6).

The utility cart 10 includes as its basic components, a base frame 20, an upright support 30, and a basket carrier frame 40.

The cart 10 is supported on rollers including a pair of front rollers 14 and 15 which are adapted to swivel about a vertical axis, and a pair of rear rollers 16 and 17 which have fixed horizontal axles. As indicated, the front rollers 14 and 15 are mounted to swivel by means of vertical swivel pins.

The cart has a base frame 20 that includes a pair of parallel side beams 21 and 22 that are connected by a crossbeam. The resulting H-shaped skeletal frame has shaped molded pieces secured thereon to provide an attractive appearance and to avoid sharp edges. The base frame 20 is horizontally stable in use.

Figure 1:
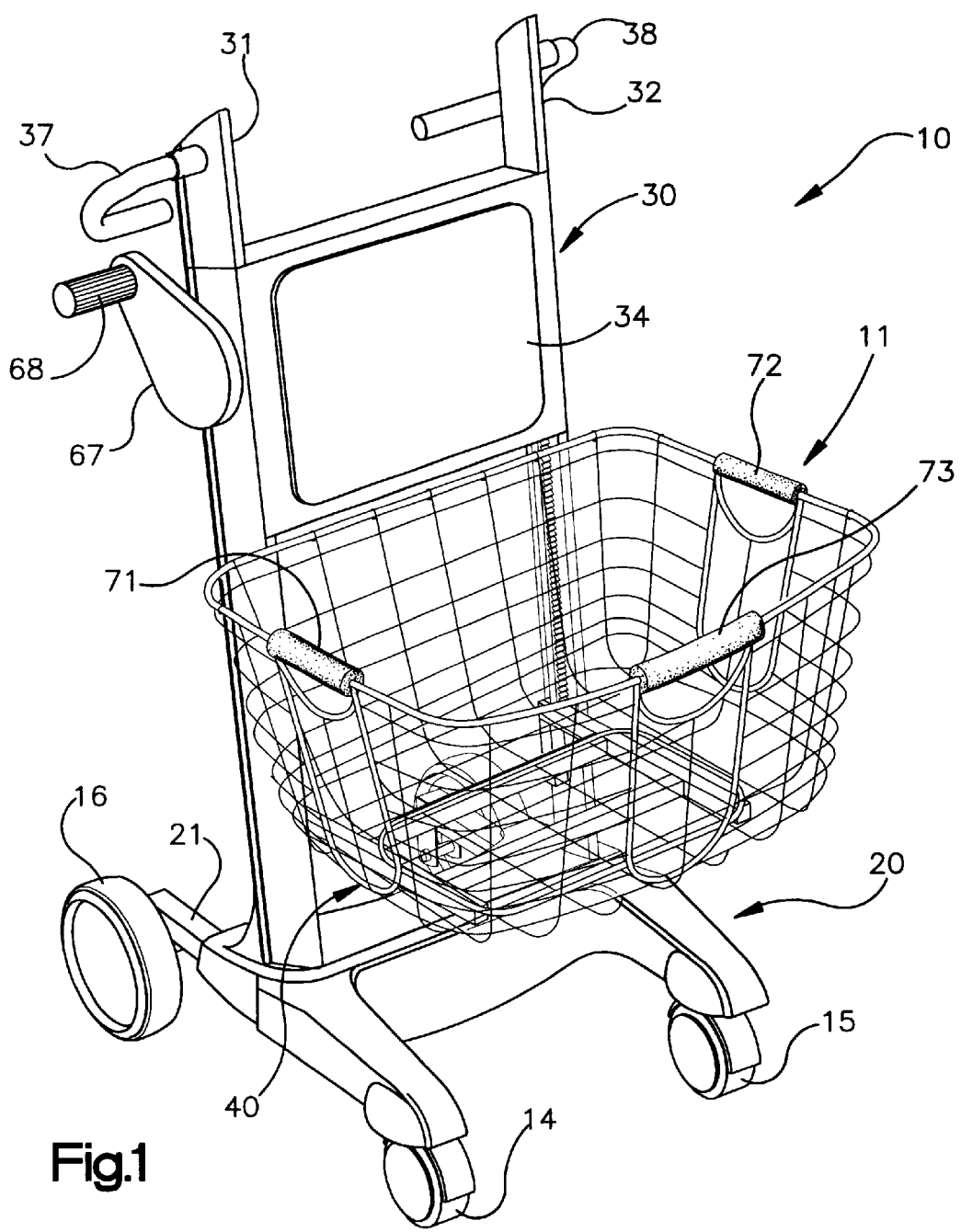
FIG. 1 is a perspective view showing a manually operated utility cart with a basket carried thereon in accordance with the invention.
Figure 2:
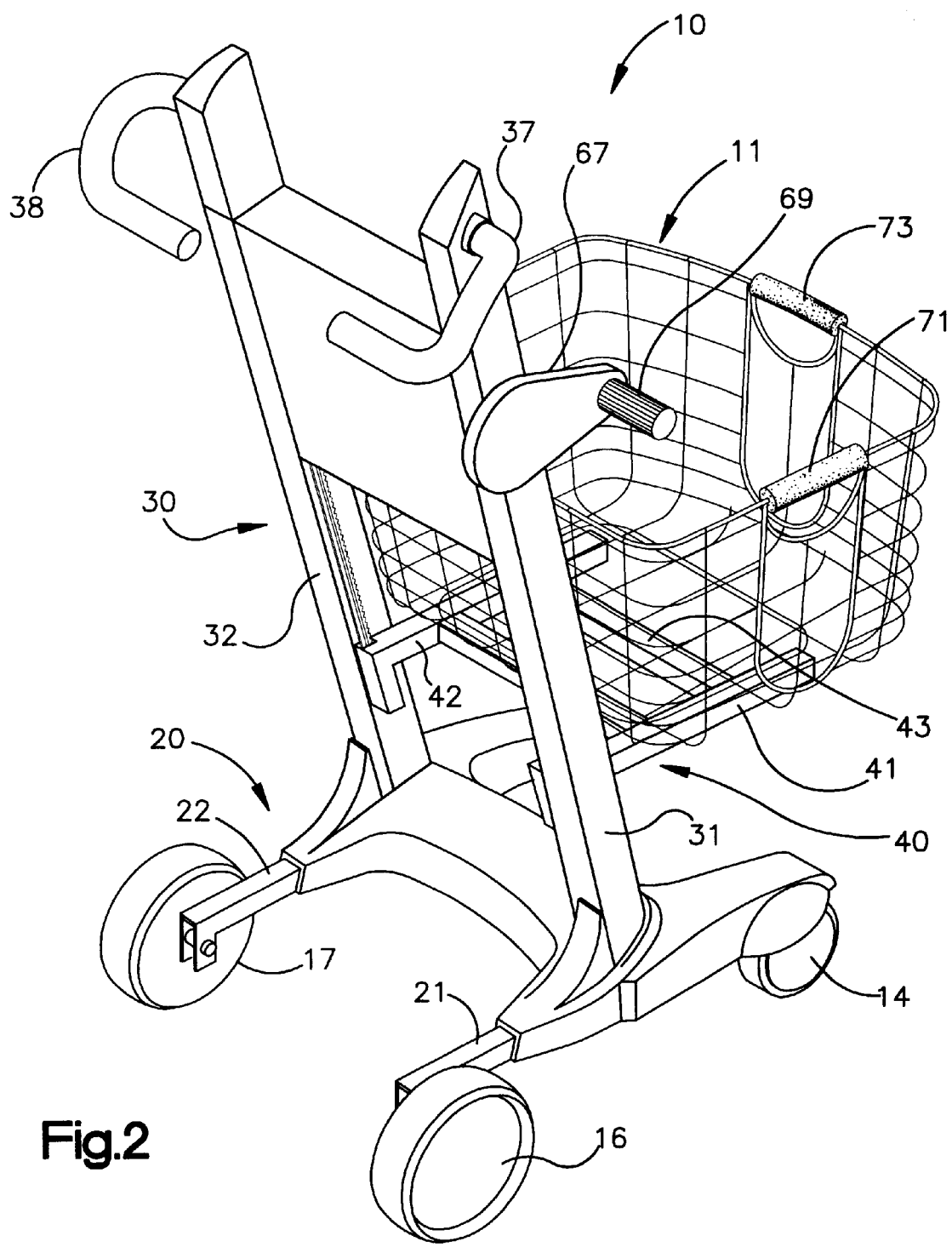
FIG. 2 is a perspective view of the manually operated utility cart of FIG. 1, but taken from a different orientation.
Figure 3:
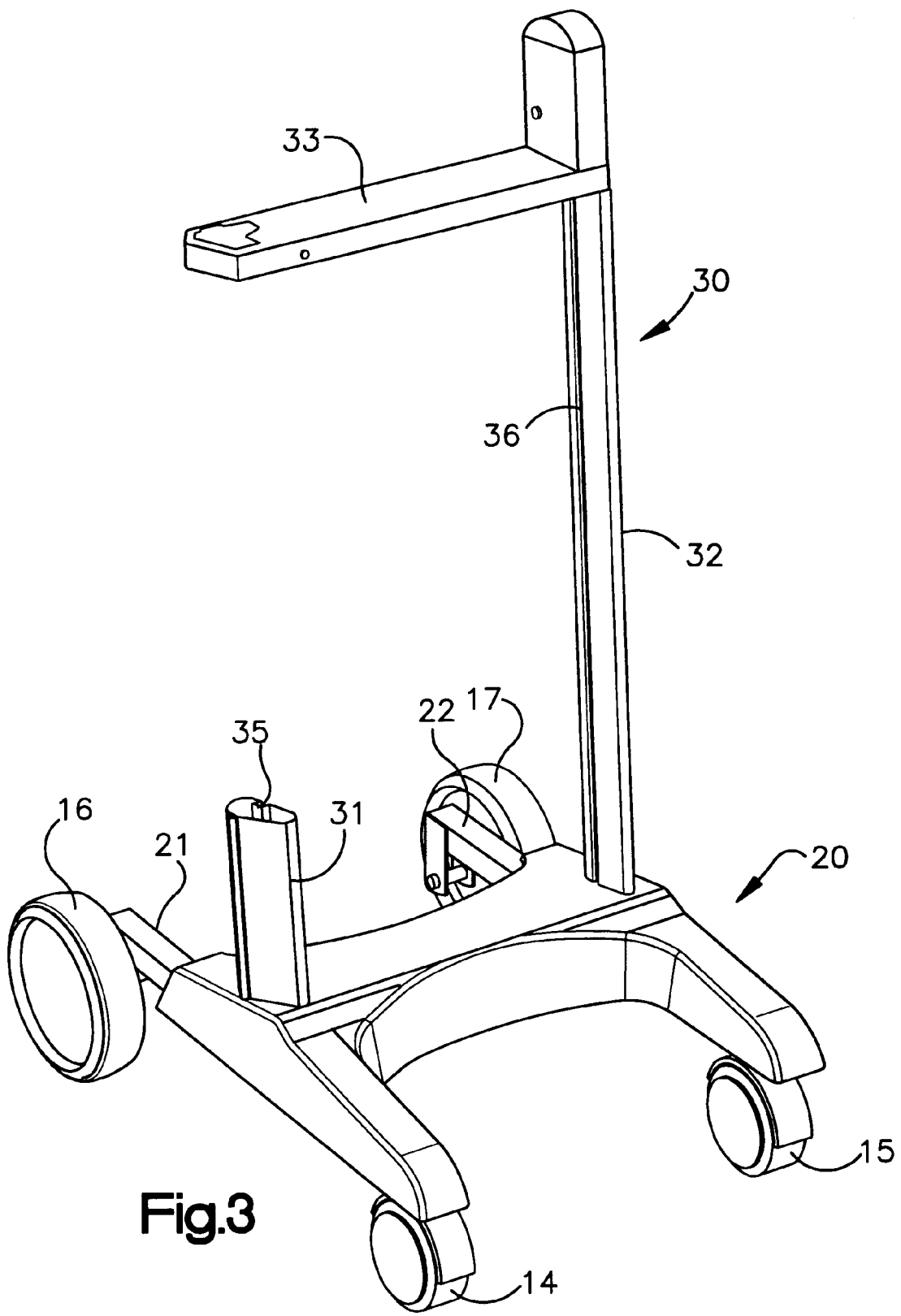
FIG. 3 is a perspective view of the manually operated utility cart of the invention with parts removed for the purpose of illustration.

Mounted on the base frame 20 is an upright support 30 (FIGS. 1, 2 and 3) that includes a pair of parallel posts 31 and 32 tightly secured to the base and connected by a crossbeam 33. The forward portion of the upright support has a front plate 34 secured thereto to provide an attractive appearance. Each post 31, 32 has a guide slot 35, 36 formed therein that serves to guide the vertical movement of the basket carrier frame 40 as will be described below. Mounted at the top of each of the posts 31, 32 are handles 37 and 38 that provide a convenient means for the user to grip the cart.

Figure 4:
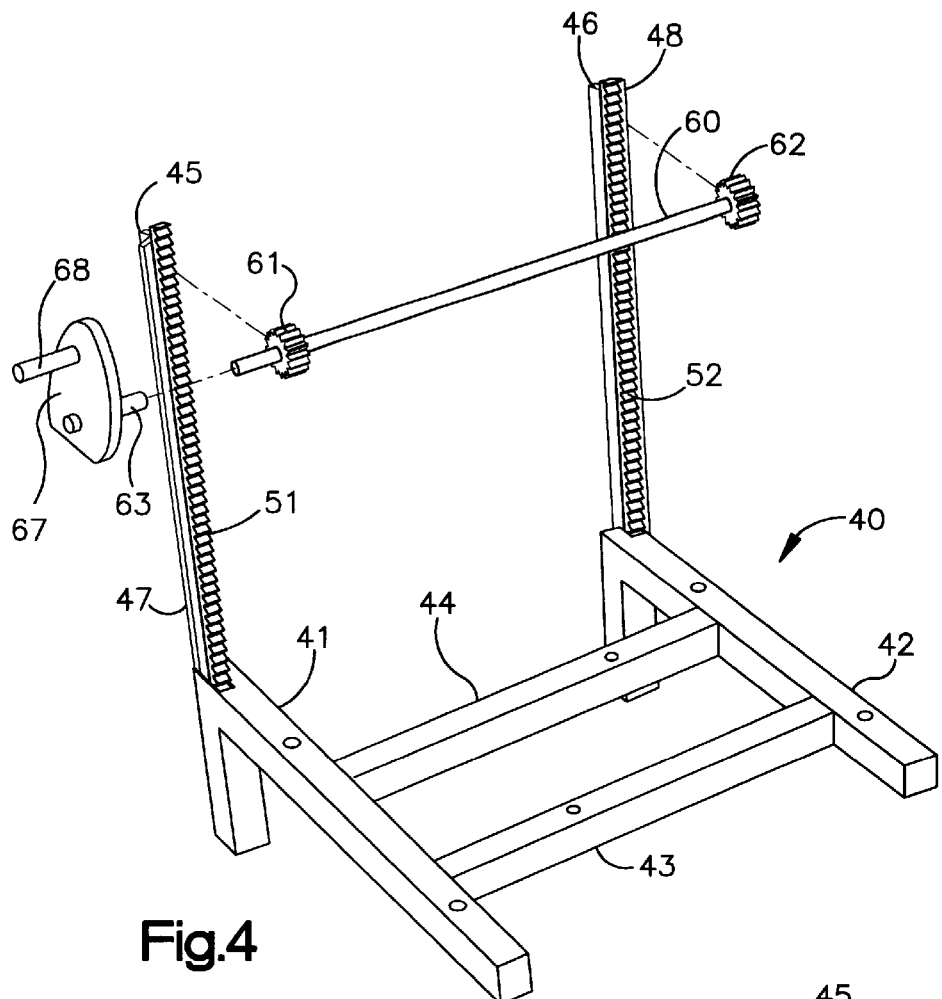
FIG. 4 is a perspective view showing the basket support component of the cart and the operating mechanism for raising and lowering the basket support.
Figure 5:
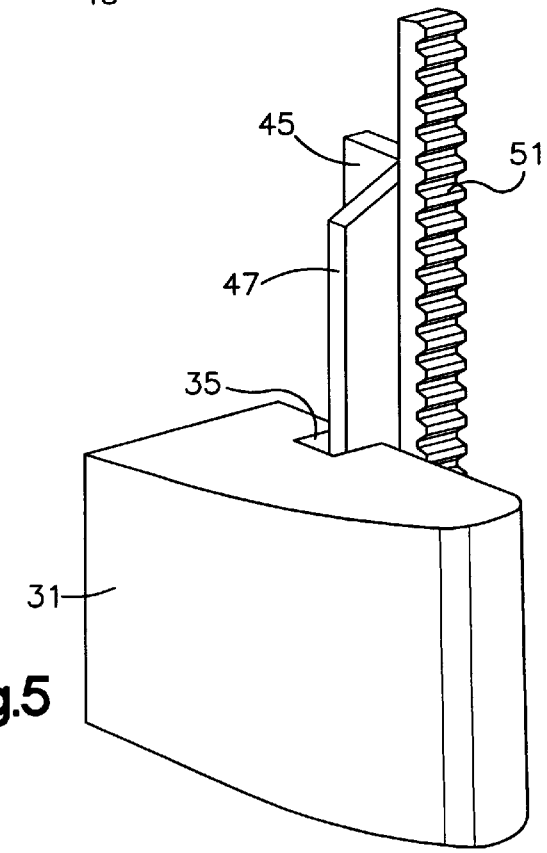
FIG. 5 is a fragmentary perspective view on an enlarged scale showing the means for guiding the raising and lowering of the basket support assembly relative to the upright frame.

The basket carrier frame 40 is best shown in FIG. 4 and includes a pair of parallel horizontal beams 41 and 42 connected together by a pair of cross members 43 and 44. The beams 41 and 42 and cross members 43 and 44 are preferably formed of suitable structural material to define a platform on which the basket 11 may be supported.

The frame 40 also includes a pair of parallel vertical members 45 and 46 that extend both downwardly and upwardly as illustrated in FIG. 4. Each of the vertical members 45, 46 has a vertical flange 47, 48 formed therein, adapted to cooperate with the guide slots 35 and 36 of the posts 31 and 32 to guide the generally vertical movement of the basket carrier frame 40 as it moves relative to the upright support 30. Mounted on the forward side of each of the flanges 47 and 48 is a rack 51, 52 which forms part of the operating mechanism for raising and lowering the basket carrier frame (FIG. 4).

A shaft 60 is journaled in the posts 31 and 32 and extends laterally between them. Located at each end portion of the shaft is a pinion 61, 62 that is fixed to the shaft 60 and rotates therewith. The pinions 61 and 62 each engage one of the racks 51 and 52 so that rotation of the shaft 60 causes raising and lowering of the basket carrier frame 40.

The shaft 60 has an extension 63 (FIG. 4) which has a crank arm 67 mounted to the outer end thereof. A crank handle 68 is mounted at the opposite end of the crank arm. Accordingly by gripping the handle 68 and turning the crank 67, the user may manually raise and lower the basket 11. Sufficient mechanical advantage is provided in the gearing mechanism so that little effort is needed to produce the desired raising and lowering.

The basket 11 is of welded rod construction and has a pair of side handles 71, 72 and a front handle 73 which can be gripped to open and close the door portion 12. The door 12 is pivotally connected at its bottom by means of a hinge device 75 which is connected to the adjacent portions of the basket. Also, latching mechanisms 77, 78 are provided at opposite sides of the door 12 to secure it in a closed position when desired. The resulting utility cart facilitates the transporting of various loads and also provides the additional utility of a mechanism for lifting and lowering the loaded basket to the most convenient vertical level.

While the invention has been shown and described with respect to a specific embodiment thereof, this is intended for the purpose of illustration rather than limitation and other variations and modifications of the specific apparatus herein shown and described will be readily apparent to those skilled in the art all within the intended spirit and scope of the invention. Accordingly, the patent is not to be limited in scope and effect to the specific embodiment herein shown and described, nor in any other way that is inconsistent with the extent to which the progress in the art has been advanced by the invention.

What is claimed is:

1. A manually operated utility cart for carrying a removable basket, comprising:

a generally horizontal base frame with rollers mounted thereon, the base frame being horizontally stable in use, a generally upright support mounted on said base frame, a basket carrier frame connected to said upright support and movable relative to said upright support between a raised position and a lowered position, a pair of parallel, generally vertical racks included as part of said basket carrier frame, a shaft journaled on said upright support, a pair of pinions mounted on said shaft, axially spaced from one another, each being operatively engageable with one of said racks, and means for turning said shaft whereby said pinions move said racks in a generally vertical path to move said basket carrier frame between said raised and lowered Positions.

2. A utility cart as defined in claim 1 wherein said means for turning said shaft comprises a crank arm connected at one end to said shaft and a handle connected to the other end of said crank arm.

3. A utility cart as defined in claim 1 wherein said upright support defines a pair of generally vertical slots, and guide means on said basket carrier frame receivable in said slots for guiding movement of said basket carrier frame when said shaft is turned.

4. A utility cart as defined in claim 3 wherein said basket carrier frame includes a pair of generally upright members to which said racks are attached, said upright members each having a flange thereon, each flange being slidably received in one of said generally vertical slots.

5. A utility cart as defined in claim 1 in combination with a basket adapted to be carried on said basket carrier frame.

6. A utility cart as defined in claim 5 wherein said basket is formed of rigid metal rod and has a generally rectangular shape.

7. A utility cart as defined in claim 6 wherein said basket has a movable side portion pivotally connected at its bottom edge whereby to provide a door that may be opened to provide improved access to the interior of the basket.

\* \* \* \* \*